Dec. 22, 1964    A. WULLSCHLEGER    3,162,299
PARKING ELEVATOR FOR VEHICLES
Filed Nov. 28, 1962    4 Sheets-Sheet 1

Inventor:
AUGUST WULLSCHLEGER
By: McGlew and Toren
Attorneys

Dec. 22, 1964  A. WULLSCHLEGER  3,162,299
PARKING ELEVATOR FOR VEHICLES
Filed Nov. 28, 1962  4 Sheets-Sheet 3
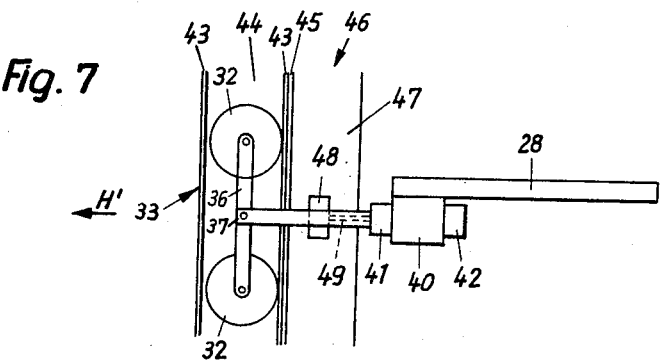
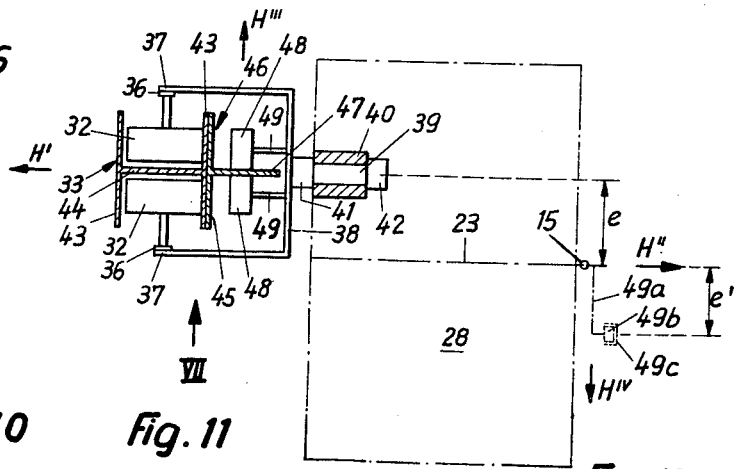
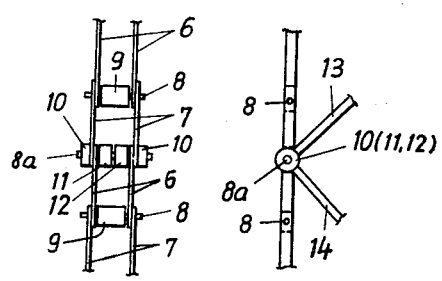
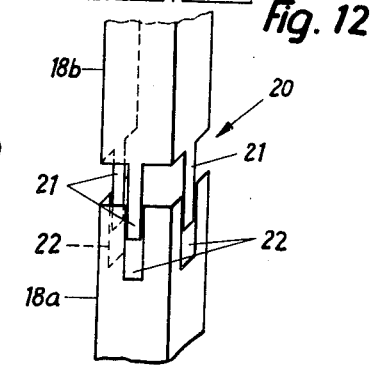
Inventor:
AUGUST WULLSCHLEGER
By: McGlew and Toren
Attorneys Dec. 22, 1964   A. WULLSCHLEGER   3,162,299
PARKING ELEVATOR FOR VEHICLES
Filed Nov. 28, 1962   4 Sheets-Sheet 4

Inventor:
AUGUST WULLSCHLEGER
By: McGlew and Toren
Attorneys

United States Patent Office 3,162,299
Patented Dec. 22, 1964

3,162,299
PARKING ELEVATOR FOR VEHICLES
August Wullschleger, 26 Martin Distelistrasse,
Olten, Switzerland
Filed Nov. 28, 1962, Ser. No. 240,567
Claims priority, application Switzerland Dec. 22, 1961
11 Claims. (Cl. 198—158)

The present invention relates to a parking elevator for vehicles such as automobiles, and has the primary object of providing such a parking elevator which is of simple and economic construction and reliable in operation.

It is a particular object of the present invention to obviate the difficulties arising in known parking elevators having two endless chains in parallel with each other on which platforms or cabins for said vehicles are suspended, said difficulties being caused by unequal elongation of said two chains.

With these and other objects in view which will become apparent later from this specification and the accompanying drawings I provide a parking elevator comprising in combination: a stationary structure, a single endless pull member movably mounted in said structure, elevator units in operation driven by said pull member, rollers journalled on said elevator units, and guide rails mounted in said stationary structure operatively engaged by said rollers, said pull members in operation moving in a plane, and said rollers in contact with said guide rails generating horizontal reaction forces perpendicular to said plane.

These and other features of my said invention will be clearly understood from the following description of some embodiments thereof given by way of example with reference to the accompanying drawings in which.

Figure 1:
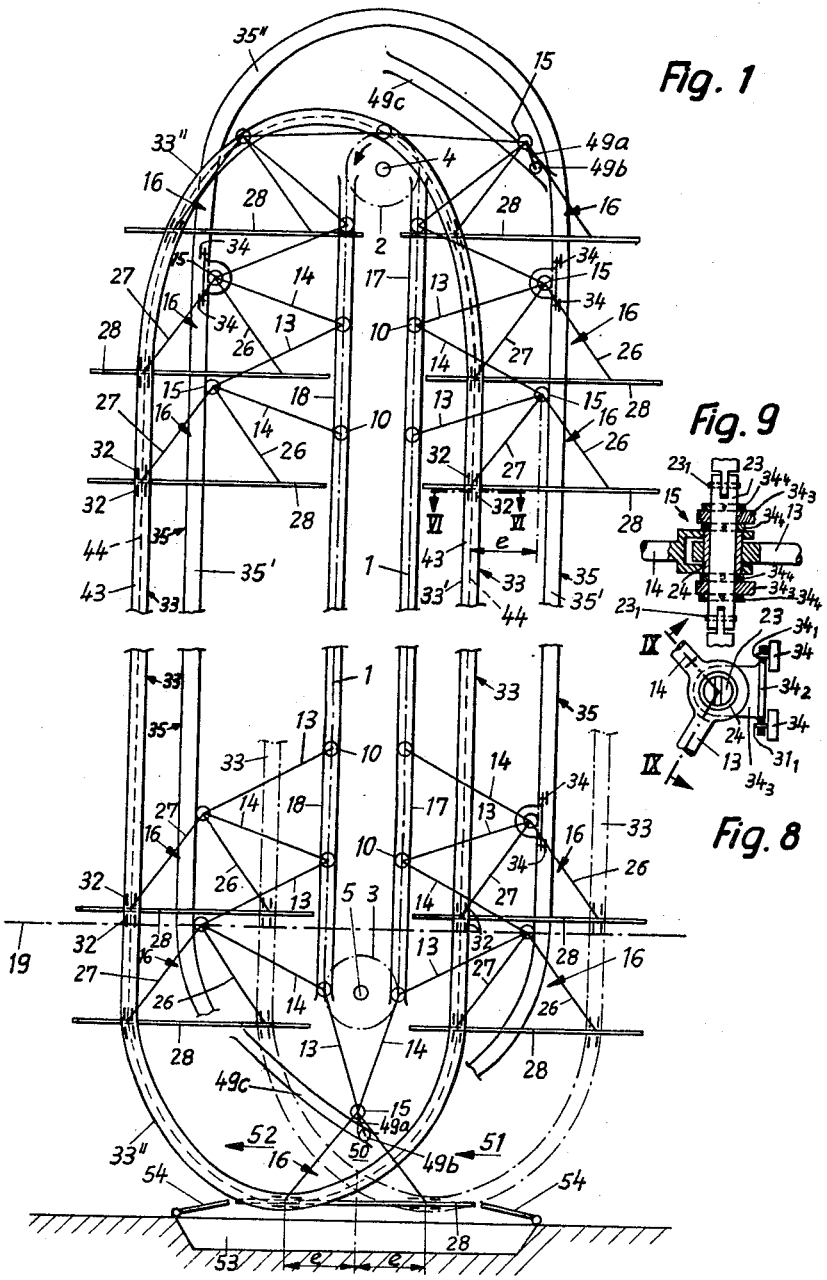
FIG. 1 is a side elevation of a parking elevator.
Figure 13:
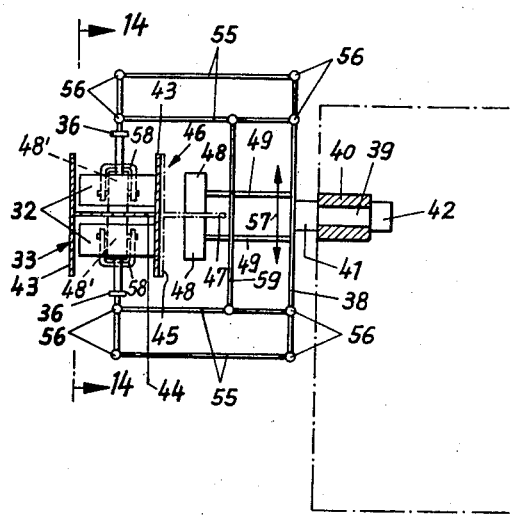
Figure 14:
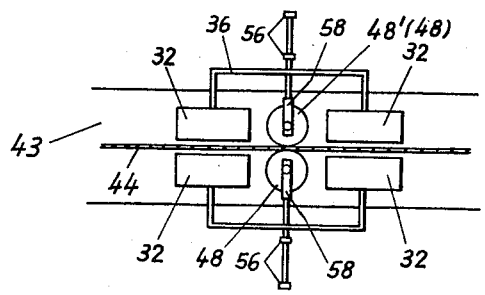

FIG. 6 is a diagrammatic section on the line VI—VI of FIG. 1 on an enlarged scale, FIG. 7 is a view in the direction of the arrow VII of FIG. 6, FIG. 8 is an elevation of a joint, FIG. 9 is a section on the line IX—IX of FIG. 8, FIG. 10 is a plan view of part of the chain, FIG. 11 is a side elevation to FIG. 10, FIG. 12 is a perspective illustration of a rail lap joint, FIG. 13 is a diagrammatic sectional illustration of a roller arrangement, and FIG. 14 is a diagrammatic section on the line 14—14 of FIG. 13.

The elevator illustrated, designed for the parking of vehicles, particularly of motor cars, has a single endless chain 1 which passes over an upper sprocket wheel 2 and a lower sprocket wheel 3. The axle 4 of the upper sprocket wheel 2 is mounted stationary, and is power driven by a drive mechanism (not shown), e.g. in the counterclockwise sense as indicated by an arrow. The bearing of the axle 5 of the lower sprocket wheel 5 is arranged vertically slidable in a manner not illustrated, a tensioning device being provided, in order to keep the chain 1 always taut. Alternatively, an arrangement is conceivable, wherein the chain tensioning device is arranged on top.

The chain 1 has, according to FIG. 10, in the usual manner alternate pairs of inner plates or links 6 and outer plates or links 7, which are connected with one another by joint bolts 8 and 8a. In the middle of the joint bolt 8 a roller 9 is fitted, the diameter of which corresponds to the shape of the interstices between the teeth of the sprocket wheels 2 and 3. The joint bolts 8a which are provided at a pitch of for example about 2 meters, carry rollers 10 at their ends protruding from their plates 6, 7. On the middle portion of the joint bolt 8a, the ends of two bars 13 and 14 provided with eyes 11 and 12 are pivotally mounted (see FIGS. 1 and 11), the other ends of which are connected with one another by a joint 15, on which an elevator unit 16 is suspended. The eyes 11 and 12 have the same outer diameter as the rollers 9, so that they likewise fit into the interstices of the sprocket wheels 2, 3.

When moving upward in the assumed sense of rotation the two rollers 10 are guided in two facing vertical U-profile rails 17 which lie in the direction of projection of FIG. 1 one behind the other, only the rear one being illustrated in this figure. On the other hand when moving downward the two rollers 10 are guided in two facing vertical U-profile rails 18. It will be seen that the rollers 10 roll on the flanges of the rails 17 and 18. Whether the rollers 10 roll on one or the other flange of the rails depends on whether the horizontal component of the compression force prevailing in the bar 13, or the horizontal component of the tensile force prevailing in the bar 14 is the overriding force on the joint bolt 8a.

When the elevator units 16 suspended on two successive joints 15 are equally loaded the said horizontal components just cancel one another out.

The U-profile rails 17 and 18 run tangentially to the pitch circles of the sprocket wheels 2 and 3 and end shortly before the same. The diameters of these pitch circles are preferably so dimensioned that half the circumference of a pitch circle is equal to the distance between two adjacent joint bolts 8a, i.e. in the present case is assumed to amount to 2 meters. When a joint bolt 8a runs off a pitch circle and the next joint bolt 8a runs on to the same, then the configuration illustrated on the bottom of FIG. 1 of the bars 13 and 14 results.

In order that upon the unavoidable elongation in the course of time of the chain 1 the distance between the lower ends of the rails 17 and 18 and the sprocket wheel 3 should not become too large, these rails 17 and 18 are provided approximately at the level of the horizontal plane 19 indicated in FIG. 1 by a chain-dotted line, with a lap joint 20 which is diagrammatically illustrated in FIG. 12 e.g. for one of the rails 18. A short lower section, denoted 18a, is separated from the upper main section 18b, and is fixedly connected with the vertically movable bearing of the axle 5 of the lower sprocket wheel 3. From the web and flanges of the lower end of the stationary main section 18b, vertical extensions 21 project into vertical recesses 22 of the upper end of the short, vertically movable section 18a. It will be seen that even when the movable section is in a position somewhat higher or lower than the position illustrated, the rollers 10 are always guided by one or the other of the flange portions overlapping one another.

Each elevator unit 16 has a horizontal suspension axle 23 (see FIGS. 2, 8 and 9), which forms the axle of the joint 15 and on which a sleeve 24 is fitted, on which the ends of the bars 13 and 14 are mounted, the end of the bar 14 being forked, as shown in FIG. 9.

Figure 2:
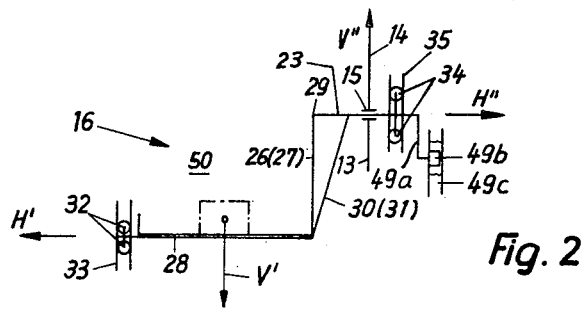
FIG. 2 is a front elevation of an elevator unit with a single vehicle cabin.

On the end point 29 of the axle 23 at the left hand side in FIG. 2 the upper ends of two bars 26 and 27 of equal length are attached, which lie in one vertical plane, are inclined symmetrically opposite one another and with their lower ends are fixed on a platform 28 having for example, a length of 4.5 meters and a width of 2 meters.

From the lower ends of the bars 26 and 27 extend further bars 30 and 31, the upper ends of which are attached on the axle 23 immediately by the side of the joint 15. The bars 30 and 31 are inclined to the vertical plane of the bars 26 and 27. The bars 30 and 31 serve for stiffening the elevator unit 16, so that it cannot be substantially deformed under the influence of a force acting in the horizontal plane of the platform 28. This horizontal force indicated by an arrow H' is a tensile force deriving from rollers 32, which are mounted on the left end of the platform 28 in a manner to be explained later in more detail, and are guided on a rail 33 (see FIGS. 1, 6 and 7).

The tensile force H' is opposed by an equal oppositely directed tensile force H'' deriving from rollers 34 mounted on the right hand side end of the axle 23 located immediately adjacent the joint 15, and guided in a rail 35. The horizontal forces H' and H'', which are perpendicular to the plane of the chain 1, generate a torque acting in the clockwise sense of FIG. 2, which holds the torque applied by the vertical forces V' and V'' in equilibrium, V' being the downwardly directed force deriving from the proper weight of the elevator unit and from the load indicated in chain-dotted lines, while V'' is the upwardly directed force acting on the joint 15, which has to be applied by the bars 13 and 14 to the joint 15, in order to balance the force V'.

According to FIGS. 6 and 7 for each platform 28 four rollers 32 are provided, any two of these rollers 32 being rotatably mounted at the ends of a rocker 36. The two rockers 36 are at their middle pivotally mounted on the ends 37 of the two prongs of a fork 38, which is fixed to a trunnion 39. The trunnion 39 is rotatably journalled in a bearing 40, which is mounted immediately below the platform 28, a shoulder 41 and a head 42 preventing an axial displacement of the trunnion 39. The rail 33 is a double T-profile rail the flanges of which are denoted 43 and the web of which is denoted 44. The rollers 32 run in the present case normally on the inside of that flange 43, which in FIG. 6 is on the right hand side, so that if desired instead of a double T-profile rail 36 alternatively a simple T-profile rail may be used.

On the right hand side flange 43 of the double T-profile rail 33 the flange 45 of a simple T-profile rail 46 is attached, on the web 47 of which two rollers 48 can roll, the axles 49 of which are fixed to the fork 38 and are parallel to the trunnion 39. It will be seen that the rollers 48 can apply a horizontal force H''' to the platform 28, which is indicated on a very much reduced scale as compared with these rollers, which force is at a right angle to the horizontal force H' and keeps an equal but opposite horizontal force H^IV balanced which passes through the joint 15. This is necessary because the horizontal forces H' and H''' do not lie in the same vertical plane and consequently apply also a horizontal moment to the elevator unit 16, which is compensated by the moment of the horizontal forces H''' and H^IV. Since the horizontal force H''' is derived from the upper roller 48 in FIG. 6, the lower roller 48 may be dispensed with if desired. The arrangement illustrated with the double T-profile rail 33 and the two rollers 48 has the advantage of counteracting any oscillations, elastic or otherwise of the platform 28.

It is clear that by a suitable construction of the fork 38 and of the rockers 36, particularly by the use of rockers having arms inclined towards one another, the two rollers 48 may be supported also on the web 44 of the double T-profile rails 33 itself, so that the simple T-profile rail 46 is then dispensed with. This construction is merely somewhat involved as regards illustration in the drawings and therefore less suitable for explanatory purposes.

The rollers 34, which for clarity of illustration are shown in FIG. 2 immediately to the right of the joint 15 instead of on the same, may be arranged in principle in the same manner as the rollers 32, the rail 35 being then constructed in the same manner as the rail 33, if desired. It is however preferable to construct the rail 35 as a U-profile rail and to let two rollers 34 only run in the same (instead of four rollers as at 32). The axles 34₁ of the two rollers 34 are according to FIG. 8 journalled in a plate 34₂, which in this figure is shown with its end broken away. The plate 34₃ stands perpendicular to two parallel lugs 34₃ connecting the same with one another, said lugs being mounted according to FIG. 9 on an axle 23 on which they are secured by collars 34₄ against axial displacement.

From FIG. 9 it can moreover be seen that the suspension axle 23 has two joints 23₁ on both sides of the joint 15 and in the immediate vicinity thereof, so that this axle 23 may be angularly deflected at will at these two joints, which is important for establishing statically determinate conditions.

The horizontal distance e between the oppositely directed forces H' and H'' is equal to the distance of the joint 15 from the rail 44 as projected on to the plane of the drawing in FIG. 1, and is also equal to the offset of the roller 32 with respect to the centre of the platform 38 as measured in the plane of the chain 1. This offset e has been provided in order to obviate the risk of selflocking of the rollers mounted on the elevator unit 16 in the regions of reversal of the direction of movement. In order to prevent this selflocking of the axle 23, at the side of the joint 15 opposite to the platform 28, a lever 49a is fixed (see FIGS. 1, 2 and 6), at the end of which a roller 49b is mounted rotatably. In part of each region of reversal a rail 49c is provided, into which the roller 49b runs and wherein it is guided over a stretch. The offset e' (see FIG. 6) of this roller 49b with respect to the axle 23 is oppositely directed relative to that of the rollers 48 and 49, and a closer investigation shows that thereby the risk of self-locking is completely eliminated. With the elevator units to be described later with reference to FIGS. 3–5 the auxiliary device 49a–49c, described is not required for overcoming the risk of self-locking since there a second arrangement of rollers 32, 48 with opposite offset is provided anyway, which performs at the same time the function of preventing self-locking exerted by the roller 49b.

The rails 33 and 35 form two self-contained guides each with two straight vertical sections 33' and 35', respectively, and each with an upper and lower arcuate section 33'' and 35'', respectively. The lower sections 33'' and 35'' and a short stretch of the vertical sections 33' and 35' up to the horizontal plane 19 are likewise fixedly connected with the vertically movable bearing of the axle 5 of the lower sprocket wheel 3, and are in connection with the stationary sections of the rails 33 and 35 by means of lap-joints of the kind explained hereinabove for rail 18 with reference to FIG. 12.

Assuming that with the present parking elevator the elevator unit 16 has to be in its lowest position in order that a motor car may drive into the single vehicle cabin 50 formed by it or drive out of the same, the entry takes place e.g. according to the arrow 51, and the exit according to the arrow 52. On the bottom below the elevator a shallow pit 53 is provided, in order to take into account the variation of the position of the lowest elevator unit 16 upon elongation of the chain 1 and at the entry- and exit-ends of this pit 53, ramps 54 with adjustable slope are provided. Of course the loading and unloading of the elevator may alternatively be effected at any other floor or at some floors.

Figure 3:
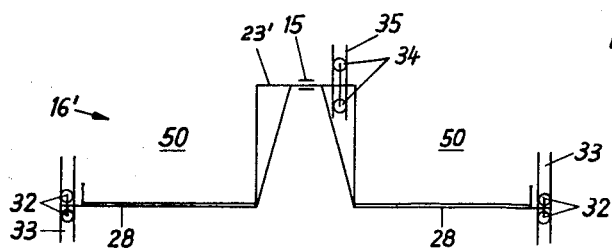
FIG. 3 is a front elevation of an elevator unit with two vehicle cabins.

The elevator unit 16' illustrated in FIG. 3 is distinguished from that according to FIG. 2 thereby that on the suspension axle 23' two symmetrical cabins are suspended, each at one side of the plane of chain 1 which forms the plane of symmetry. Each cabin 50 is constructed in the same manner as the cabin 50 described hereinabove.

This symmetrical embodiment has not only the advantage of double capacity but also that upon equal loading of the two cabins 50 the corresponding reaction forces H'' cancel one another out in the axle 23', i.e. no force is then acting in the direction of this axle 23' on the suspension joint 15. Nevertheless the rollers 34 and the rail 35 cannot be dispensed with, since naturally one of the two cabins 50 only may be loaded. If the joints $23_1$ were not provided, a statically indeterminate system would exit, and the reaction forces H' would depend on the stiffness of the elevator unit. Since the bending loading of the axle 23 or 23' would in general then reach nonpermissibily high values, it is preferable to provide the joint $23_1$ and thereby to prevent the danger of fracture of this axle. However the use of statically indeterminate systems is by no means to be excluded.

Figure 4:
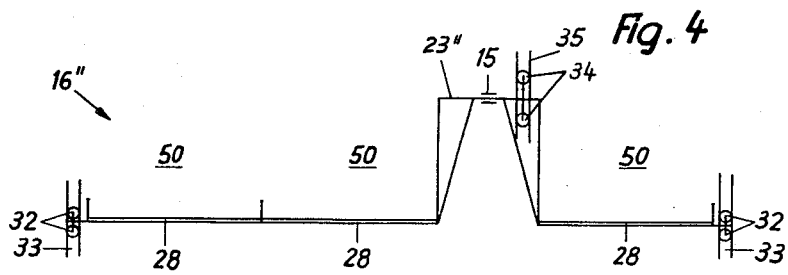
FIG. 4 is a front elevation of an elevator unit with three vehicle cabins.

The asymmetrical elevator unit 16" according to FIG. 4 has two cabins 50 at one side of the plane of the chain, and one cabin 50 only at the other side thereof suspended on the suspension axle 23'. The elevator unit 16''' according to FIG. 5 is again symmetrical, and has two cabins suspended on the suspension axle 23''' on either side of the plane of the chain.

Figure 5:
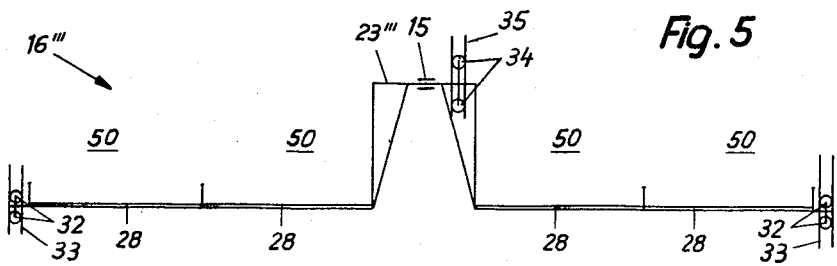
FIG. 5 is a front elevation of an elevator unit with four vehicle cabins.

In the embodiments according to the FIGS. 3–5 the rollers 32 on the right hand side will be arranged offset with respect to the centre of the cabin towards the other side from the left hand side rollers 32, whereby the necessity of the auxiliary device 49a–49c is dispensed with.

When the offset e of the right hand side and of the left hand side rollers, taken absolutely, is made equal, e.g. about half the width of the platform 28 from the suspension axle 23, the rails 33 for the right hand side rollers 32 are positioned as indicated in chain-dotted lines in the lower part of FIG. 1. With a symmetrical elevator unit and equal loading of the cabins one has then the advantage, that in the suspension joint 15 no force $H^{IV}$ acting at right angles to the suspension axle 23' or 23''' occurs.

As compared with the usual parking elevators having two parallel endless chains, there results a considerable reduction of the structural expense and of the costs owing to the elimination of one chain 1 with its associated elements such as sprocket wheels 2, 3, suspension members 13, 14 for the elevator units, rollers 10 and rail guides 17, 18 for the suspension members, although obviously the single chain and its associated elements are loaded twice as heavily as with the use of two chains. Likewise the drive of the plant is considerably simplified. By the use of high grade structural materials, particularly steel, one may without difficulty keep high safety co-efficient with practically convenient dimensions. The elevator units 16'–16''' may even be graded with respect to one another, higher grade steel sorts being used the longer are the suspension axles.

A further advantage of the use of a single chain only consists in that no skewing of the elevator unit owing to unequal elongation of the chains has to be feared. Guide rails for rollers mounted on the elevator units are needed anyway even when using two chains, in order to prevent pendulum oscillations of the elevator units about their suspension axis. The fact that with the single-chain elevators described additional rollers 32 are needed, which are positioned perpendicular to the rollers 48 preventing such pendulum oscillations is practically of no account. Inherently, instead of the known rollers 48, which prevent pendulum oscillations about the suspension axis, other known means may be used, particularly in the regions of reversal of movement such as the star wheels described in the U.S. patent application No. 49,580 of the applicant.

The endless chain needs not run vertically everywhere, but may comprise also horizontal or inclined part-sections, in which case obviously further sprocket wheels are required at the points of deflection.

When using an axle 23 with joints $23_1$ and the arrangement of rollers 32 and 48 statically completely determinate conditions are attained in the vertical sections of the cabin path, but not in the region of reversal of movement. It has to be noted, that in the regions of reversal the reaction makes transition gradually from the direction in which H''' lies originally, into the vertical direction, and lies vertically at the point of reversal of the movement. How far then the rollers 33 in fact produce a horizontal reaction in these regions of reversal, depends on the deformations which the elevator unit and the system of rollers undergo.

If statically determinate conditions are desired also in the regions of reversal of movement, the roller arrangement illustrated in FIGS. 13 and 14 may be provided. Two pairs of rollers 32 are likewise arranged at each end of the rocker 36, which is pivoted at its middle to the ends 37 of the two prongs of the fork 38, which is in turn fixed to the trunnion 39.

The two prongs of the fork 38 are, however, not rigid, but each arm has an articulated parallelogram 55, the joints of which are denoted 56. It is accordingly clear that the trunnion 39 may move with respect to the rollers 32 in the direction of the double arrow 57, while the rollers remain on the same spot in their guide rail 33, viz. regardless of whether the rail extends vertically or horizontally, the latter being the case at the reversal points.

Rollers 48' are mounted on small forks 58, which are fixed at the middle of the rockers 36, and they run on the web 44 of the double T-profile rail 33.

A connecting bar 59 provided between the two articulated parallelograms 55 and pivotally attached to them enforces a movement of the parallelograms in the same sense, and keeps the rollers 48' in contact with the web 44.

Moreover on the fork 38—as in the case of FIG. 6— two axles 49 are arranged parallel to the trunnion 39, which carry two rollers 48 capable of running on the web 47 of a T-profile rail 46. The T-profifile rail 46 is indicated in chain-dotted lines in FIG. 13, since it is not arranged over the entire length of the double T-profile rail 33, but only on the vertical sections 33' of the double T-profile rail and on an adjacent part of the arcuate sections 33''. In the vicinity of the reversal points of the arcuate section 33'', corresponding to an angular range of about 90°, the T-profile rail 46 is omitted.

When using the roller arrangement according to FIGS. 13 and 14 the parallelograms 55 will be deformed in the regions of reversal where the T-profile rail 46 is omitted at any time to such an extent as required in order that the rollers 32 generate in a statically determinate manner the horizontal reaction H', which corresponds to the moment of the vertical forces, while this reaction is generated by the rollers 48 where the T-profile rail is provided.

While I have herein described and illustrated in the accompanying drawings what may be considered typical and particularly useful embodiments of my present invention, I wish it to be understood that I do not limit myself to the particular details and dimensions described and illustrated; for obvious modifications will occur to a person skilled in the art.

What I claim as my invention and desire to secure by Letters Patent, is:

1. A parking elevator for vehicles, comprising in combination: a stationary structure, a single endless pull member movably mounted in said structure, elevator units in operation driven by and suspended on said pull member, rollers journalled on said elevator units, and guide rails mounted in said stationary structure operatively engaged by said rollers, said pull member in operation moving in a vertical plane, and said rollers in contact with said guide rails generating horizontal reaction forces perpendicular to said plane, each of said elevator units having a suspension axle attached to said pull member and at least one platform fixedly connected with and suspended on said suspension axles and said endless pull member having joint bolts, and comprising pairs of bars, one end of each said pairs forming a suspension joint with one of said suspension axles, and the other ends of each of said pairs being pivotally connected with two of said joint bolts spaced from one another.

2. A parking elevator as claimed in claim 1, wherein each of said joint bolts is pivotally connected with two of said bars the other ends of which are connected with different suspension axles.

3. A parking elevator as claimed in claim 1, wherein said pull member is an endless link chain, and comprising sprocket wheels for said chain journalled in said stationary structure and profiled rails arranged in said structure tangentially between said sprocket and rollers rotatably mounted at the ends of said joint bolts and guided in said profiled rails.

4. A parking elevator as claimed in claim 1, comprising rollers rotatably mounted on each of said platforms and operatively engaging said guide rails so as to generate a horizontal reaction force lying substantially in the plane of said platform, and comprising rollers rotatably mounted on said suspension axle and guided in said guide rails so as to generate a horizontal reaction force lying substantially in the direction of said suspension axle.

5. A parking elevator as claimed in claim 4, wherein said guide rails have flanges forming two closed guide tracks lying in two parallel planes offset from one another, said rollers rotatably mounted on said platforms being guided on one of said closed tracks, and said rollers rotatably mounted on said suspension axles being guided on the other one of said closed tracks.

6. A parking elevator as claimed in claim 5, wherein said guide rails have a profile having flanges and a web, and comprising additional rollers journalled on each of said platforms guided on the said web.

7. A parking elevator as claimed in claim 6, comprising a trunnion horizontally mounted on each of said platforms, a fork having two prongs pivotally mounted on said trunnion, a rocker pivotally mounted at its middle on the end of each of said prongs, a roller guided on the web of said guide rails and journalled at the end of each of said prongs about an axis parallel to said trunnions, and rollers journalled at both ends of said rockers about axes perpendicular to said trunnion and guided on the flanges of said guide rails.

8. A parking elevator for vehicles, comprising in combination: a stationary structure, sprocket wheels journalled in said structure, a single endless chain having joint bolts and running over said sprocket wheels in a plane perpendicular to the axes thereof, guide rails mounted in said structure, elevator units in operation driven by and suspended on said endless chain, each of said units comprising a suspension axle, at least one platform suspended on and fixedly connected with said suspension axle, and pairs of bars, one end of each of said pairs forming a suspension joint with said suspension axle and the other ends of said pair being pivotally connected with two of said joint bolts spaced from one another, rollers journalled on said platform and guided on some of said guide rails so as to generate horizontal reaction forces lying substantially in the plane of said platform and rollers journalled on said suspension axle and engaging some of said guide rails so as to generate reaction forces lying substantially in the direction of said axles, said rollers journalled on said platform being offset from said suspension axle in the horizontal direction so as to prevent any self-locking thereof.

9. A parking elevator as claimed in claim 8, wherein the magnitude of said offset is substantially equal to half the distance between said platform and said suspension axle.

10. A parking elevator as claimed in claim 8, wherein each of said elevator units comprises one platform on either side of the plane of said endless chain, and wherein said rollers journalled on said two platforms have equal and opposite offsets from said suspension axle.

11. A parking elevator as claimed in claim 8, comprising in addition: a lever fixed to each of said suspension axles, a roller journalled at the end of said lever, arcuate guide rails mounted in said structure adjacent said sprocket wheels so as to extend around part of the circumference of said sprocket wheels at the regions, where said endless chain reverses the direction of its movement, said roller journalled on said lever being guided in said arcuate guide rails and lying on the opposite side, with respect to said suspension axles of said rollers journalled on said platform, so as to prevent self-locking thereof.

References Cited in the file of this patent

UNITED STATES PATENTS

| 1,270,001 | Boos et al. | June 18, 1918 |
| 1,757,819 | Taylor | May 6, 1930 |
| 2,719,623 | Bower | Oct. 4, 1955 |

FOREIGN PATENTS

| 294,658 | Germany | Oct. 19, 1916 |
| 424,919 | Germany | Feb. 5, 1926 |
| 412,319 | Great Britain | June 28, 1934 |